United States Patent [19]

Gidseg et al.

[11] Patent Number: 4,789,121
[45] Date of Patent: Dec. 6, 1988

[54] SYSTEM FOR SUPPORTING AND ADJUSTING REFRIGERATORS AND THE LIKE

[75] Inventors: Edward D. Gidseg, 16 Duke of Gloucester, Manhasset, N.Y. 11030; Jan Ganik, Fresh Meadows, N.Y.

[73] Assignee: Edward D. Gidseg, Manhasset, N.Y.

[21] Appl. No.: 45,943

[22] Filed: May 1, 1987

[51] Int. Cl.$^4$ .......................................... F16M 11/20
[52] U.S. Cl. .............................. 248/188.2; 248/188.4; 248/346.1; 248/678; 312/255
[58] Field of Search ............... 248/188.2, 188.4, 346.1, 248/346, 678; 312/255, 253; 16/19

[56] References Cited

U.S. PATENT DOCUMENTS

| | | |
|---|---|---|
| 1,849,835 | 3/1932 | Jantzen et al. |
| 2,544,822 | 3/1951 | Brown ........................ 248/188.4 X |
| 2,853,732 | 9/1958 | Matter . |
| 2,874,971 | 2/1959 | Devery ....................... 248/188.2 X |
| 3,329,105 | 7/1967 | McPherson .................. 248/188.2 X |
| 3,356,324 | 12/1967 | Attermeyer . |
| 3,491,977 | 1/1970 | Iller . |
| 3,534,430 | 10/1970 | Kesling et al. . |
| 3,716,890 | 2/1973 | Benson . |
| 3,750,989 | 8/1973 | Bergeson . |
| 4,364,148 | 12/1982 | McVicker .................... 248/188.2 X |
| 4,368,869 | 1/1983 | Gelvezon et al. ............ 248/188.2 X |
| 4,518,142 | 5/1985 | Sulcek et al. ................ 248/188.2 X |
| 4,560,147 | 12/1985 | Bowden . |
| 4,592,532 | 6/1986 | Stith .......................... 248/188.2 X |

Primary Examiner—Ramon O. Ramirez
Attorney, Agent, or Firm—Pennie & Edmonds

[57] ABSTRACT

A system for supporting a refrigeration cabinet is disclosed wherein the cabinet has a base or lower portion on which it rests. The system includes roller support means mounted to the base portion of the cabinet at a first location closest to the front accessible part of the cabinet and roller support means mounted to the base portion of the cabinet at a second location remote from the first roller support. This last mentioned roller support is usually positioned at the rear corner of the cabinet which is normally inaccessible in built-in appliances. An adjusting mechanism is provided for conveniently adjusting the dimension between the base portion of the refrigerator cabinet and the first roller support. This adjusting mechanism is located at the first mentioned accessible location closest to the front part of the cabinet. The system also includes means for adjusting the dimension between the base portion of the refrigerator cabinet and the second roller support, this adjusting mechanism being located in the same first mentioned accessible location thus facilitating respective adjustment of the first and second roller supports so as to adjust the respective heights of two corner portions of the cabinet from a single common accessible location, namely, in the front accessible part thereof, all while permitting roller movement of the cabinet on the respective roller supports.

14 Claims, 3 Drawing Sheets

SYSTEM FOR SUPPORTING AND ADJUSTING REFRIGERATORS AND THE LIKE

TECHNICAL FIELD

This invention relates to an adjustable support system for cabinets in which adjustment of the relative height of the corners of the cabinet is specifically required or desirable. In particular, the invention relates to an adjustable roller support system for refrigerators or any heavily weighted cabinets in which adjustment of the height of the cabinet would normally be difficult for reasons of weight and/or access.

BACKGROUND ART

Refrigerators and built-in appliances generally which are presently available to the consumer are almost always provided with an arrangement for adjustably supporting each of their four corners. These adjustable support arrangements are normally provided to facilitate levelling of the cabinet for various reasons, the most significant of which includes efficient operation. For example, an appliance such as a refrigerator is often required to be either level or near level so that the refrigeration equipment will be in the proper orientation for proper functioning. A second reason is to facilitate proper closing of the door of the refrigerator since in some instances the refrigerator door is made self-closing by inclining the refrigerator slightly toward the rear or by structuring the hinges in a manner to cause the refrigerator door to close automatically by such inclination.

Adjustment of the height of each corner of the appliance has often been a difficult task with the support and adjustment mechanisms which have been provided in the past. The most common adjustable support mechanism in use has been in the form of a threaded rod having a foot attached to the lower portion and being threadedly engaged within a threaded nut or threaded female member attached to the structure at each corner of the refrigerator. Adjustment of the refrigerator therefore involves lifting the refrigerator off the base support and threadedly advancing or withdrawing the rod from the nut-like member so as to lower or raise each respective corner. The procedure often involves heavy lifting and trial and error to make certain that each corner portion of the refrigerator is of the appropriate height to achieve the proper level or inclination as may be desired.

More often than not, this lifting and trial and error adjustment procedure is made particularly difficult for the portion of the refrigerator or appliance which is remote from the normally accessible front corners because, as a practical matter, it is difficult and sometimes impossible to gain access to the rear corners of the appliance for the purpose of lifting those corners and making the appropriate rod adjustment. In particular, the most illustrative example of such a situation is a built-in refrigerator, dishwasher, washing machine, dryer or the like.

In some instances, designs have been proposed whereby an appropriate adjustment of a remote corner of an appliance has been made possible by a complicated linkage system which is mounted beneath the appliance and utilized to rotate an appropriate structure to provide adjustment of the remote corners of the appliance. In some of these structures, a tool has been supplied with the appliance for insertion thereunder for adjustment of an appropriate mechanism at the remote location. Such arrangements have proven to be difficult to use by consumers and not very reliable in raising or lowering the cabinet against its own inherent weight, together with the weight of the foodstuffs being stored within the cabinet.

In addition to the above described mechanisms, various other adjustable support devices have been used. Such support devices include combinations of threaded rods with lower foot supports, elongated mechanisms for controlling movable supports at remote locations of the appliance from accessible locations thereof and relatively complicated brackets and threaded members generally to support the appliance. Often such refrigerators are supported on shoes made of steel plate members or other supporting structures.

Such devices have been found to be difficult to operate for a number of reasons due in part to the weight of the appliance and the support structures employed. In addition, appropriate friction eliminating devices, such as roller castors and bearings or sleeves, which normally promote smooth operation, are not present. We have invented an adjustable roller support for such appliances which has eliminated the disadvantages of the prior art while making adjustment of all four corners of the cabinet extremely simple and convenient from the two front accessible corner locations. In particular, adjustment of the front locations is accomplished by use of a simple spanner wrench and adjustment of the rear locations is accomplished by the use of a socket type or equivalent wrench introduced into each front accessible location whereby adjustment of the corresponding remote location rearward thereof is made.

SUMMARY OF THE INVENTION

The invention relates to a system for supporting and adjusting a cabinet which includes a base portion for supporting the cabinet, which comprises support means mounted to the base portion of the cabinet at a first location closest to a front accessible portion thereof, support means mounted to the base portion of the cabinet at a second location remote from the first support means, means for adjusting the dimension between the base portion of the cabinet and the first support means, the adjusting means being located generally at the first mentioned accessible location closest to the front portion, and means for adjusting the dimension between the base portion of the cabinet and the second support means and having adjustable control means located in the first mentioned accessible location thereby facilitating respective adjustment of the first and second roller support means to adjust the respective height of two portions of the cabinet from a common generally accessible location. Preferably, the first and second mentioned support means are roller support means which support the cabinet while permitting rolling movement of the cabinet on the roller support means.

In the preferred form, the system includes adjustable roller support means mounted to the base portion of the cabinet at the first location and includes rotatably mounted rollers for supporting the cabinet. The adjustable roller support means mounted to the base portion of the cabinet at the second location preferably includes a rotatably mounted roller for providing a roller support to the cabinet. The system further includes roller support means at the first mentioned location in the form of a male threaded member concentrically threadedly engaged with respect to a female threaded member positioned at the base portion of the cabinet. The threaded member is threadedly engaged within a first female threaded member and the outer portion of the female threaded member is in turn threadedly engaged in mating engagement within a threaded outer female member. The direction of inner threads of the second mentioned female member is opposite the direction of the threads of the male member and the threads of the inner portion of the first mentioned female member threadedly engaged therewith.

In the system according to the invention the first mentioned male member is a rod having a right hand thread and the first mentioned female member is a cylindrical sleeve threaded on its outer portion with a left hand thread. The threaded rod is in turn connected to an inverted U-shaped roller support having a roller castor rotatably supported thereon by an axle member extending across the inverted U-shaped roller support. The first mentioned female member includes an adjustment nut capable of being rotatably adjusted—as by a wrench—to raise or lower the roller with respect to the cabinet. The adjustment nut is turnable in a first direction to cause the first mentioned female member to withdraw from the second mentioned female member while causing the male threaded rod to withdraw from the first mentioned female member while the inverted U-shaped bracket and the roller means and male threaded rod are held fixed from rotation. This can be done manually, but is preferably accomplished by the provision of an anti-rotation bracket attached to the roller housing and made to slidably enter a channel extending through the bottom wall of the cabinet. Rotation of the adjustment means in the opposite direction while thus preventing the inverted U-shaped bracket and the male threaded rod from rotating causes the first mentioned female member to threadedly advance upwardly into the base portion of the cabinet while also causing the male member to threadedly advance further upwardly into the first mentioned female member due to the oppositely configured threads respectively thereon.

In the preferred embodiment, the invention relates to an adjustable roller support system for a refrigerator cabinet which comprises a base support structure for supporting the cabinet, roller support means mounted to the base support structure of the cabinet at a first accessible location close to the front of the cabinet, roller support means mounted to the base support structure of the cabinet at a second location remote from the first location, means for adjusting the dimension between the base support structure of the cabinet and the first roller support means.

The adjusting means includes a first cylindrical member threadedly engaged for upward and downward movement within a second internally threaded cylindrical member fixed to the base structure, an elongated rod member threadedly engaged for up and down movement within the first mentioned cylindrical member, the threads on the elongated rod member being opposite in direction to the threads on the first mentioned cylindrical member. The threaded rod member is connected to a roller housing in which a support roller is rotatably mounted, whereby rotating the first mentioned cylindrical member in a first direction while retaining the roller housing in fixed position against rotation causes the first mentioned cylindrical member and the rod member to advance in a first direction. Conversely, rotation of the first mentioned cylindrical member in a second direction while retaining the roller housing in fixed position against rotation causes the first mentioned cylindrical member and the rod member to advance in the opposite direction to adjust the dimension between the base support structure and the roller support to adjust the height of the corresponding portion of the cabinet.

A housing is connected to the base structure and extends from the first mentioned accessible location to a location remote from the first mentioned location. Roller support means is rotatably mounted to the housing at the remote location. The roller support means is rotatably supported within a roller housing pivotally mounted to the first mentioned housing to vary the vertical dimension between the base support structure and the bottom of the roller support means to facilitate adjustment of the vertical height of the corresponding portion of the cabinet.

An elongated threaded adjustment rod extends from the first accessible location to the remotely positioned roller support means and is fixedly supported for threaded rotation from the accessible location. The threaded rod is threadedly engaged within a female threaded follower member attached to the remotely positioned roller housing such that rotation of the threaded rod in a first direction causes the roller housing to pivotally rotate in a first direction to increase the dimension between the roller means and the base structure. Conversely, rotation of the threaded rod in the opposite direction causes pivotal rotation of the remotely positioned roller housing in the opposite direction to decrease the dimension between the base structure and the roller means thereby facilitating adjustment of the height of the corresponding portion of the cabinet from the first accessible location.

The adjustable support system preferably includes adjustment nut members positioned at the first mentioned accessible location to rotate the threaded adjustment rod to thereby adjust the height of the remote portion of cabinet as well as the accessible portion of the cabinet from the same accessible location.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
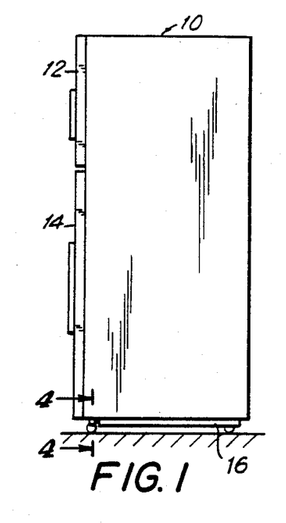
FIG. 1 is a view of a refrigerator incorporating the adjustable support system of the present invention showing the refrigerator at its lowest position.
Figure 2:
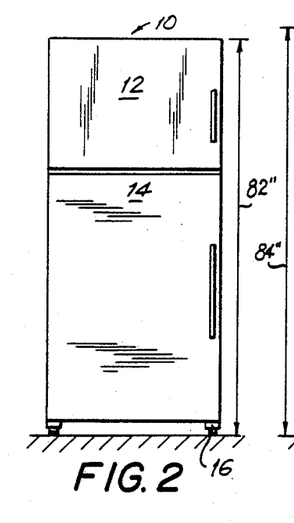
FIG. 2 is a front view of the refrigerator of FIG. 1 showing the refrigerator and the support system at an intermediate adjusted position.
Figure 3:
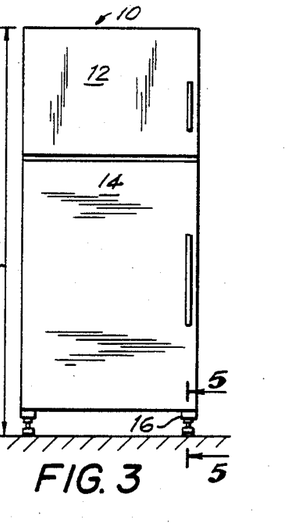
FIG. 3 is a front view of the refrigerator of FIG. 2 showing the refrigerator and the support system at the maximum height adjusted position.

Referring initially to FIGS. 1-3, there is illustrated a refrigerator 10 having upper freezer door 12 and lower refrigerator door 14. FIG. 1 illustrates the refrigerator being supported on support system 16 according to the invention, the support system being at its lowest position, i.e. the lowest refrigerator height attainable without removing the support system.

FIG. 2 illustrates the same refrigerator as shown in FIG. 1 with the support system adjusted at the intermediate refrigerator height position.

FIG. 3 illustrates the same refrigerator as shown in FIGS. 1 and 2 with the support system adjusted at the maximum refrigerator height position.

Figure 4:
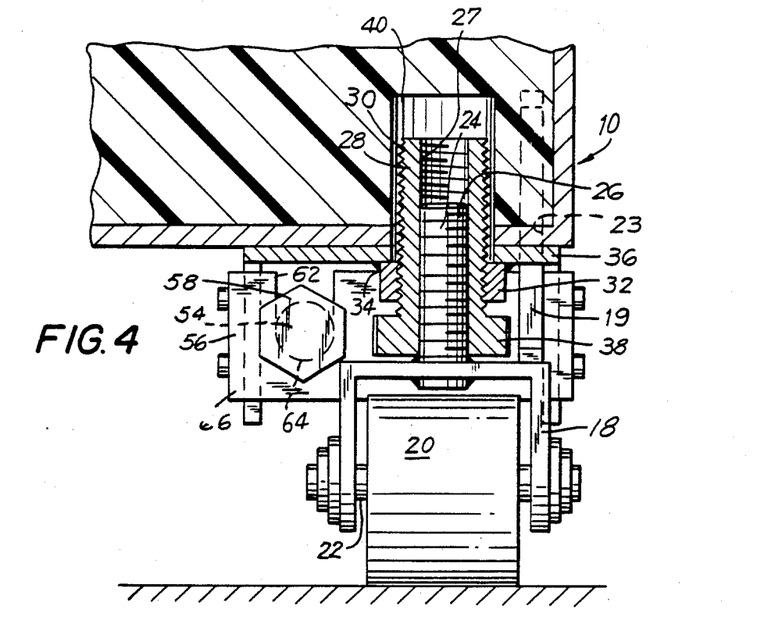
FIG. 4 is a view partially in cross-section taken along lines 4—4 of FIG. 1.
Figure 5:
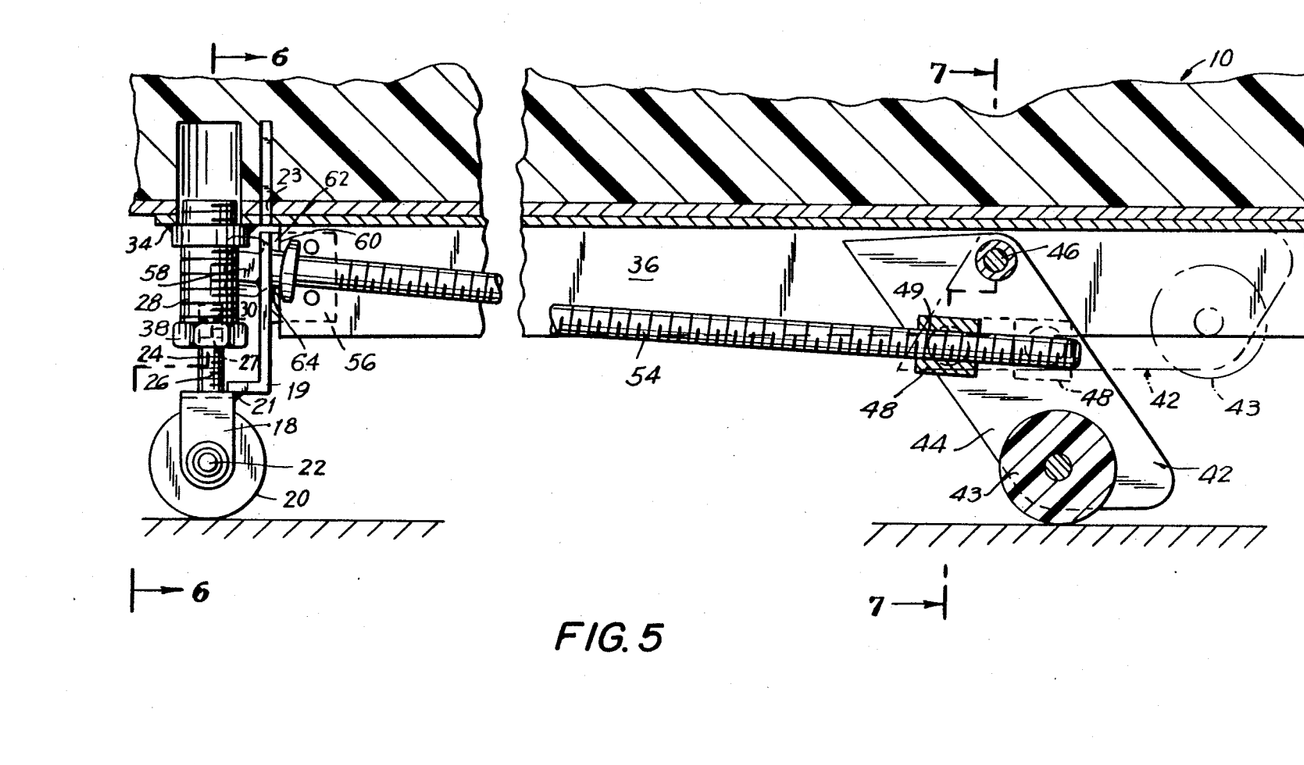
FIG. 5 is a view partially in cross-section taken along lines 5—5 of FIG. 3 as viewed from the side of the refrigerator.
Figure 6:
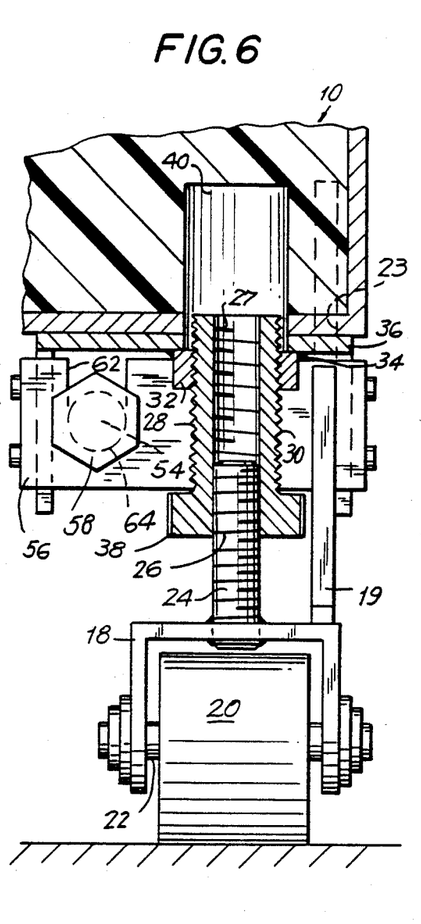
FIG. 6 is a view partially in cross-section taken along lines 6—6 of FIG. 5.

Referring now to FIG. 4 in conjunction with FIG. 5, the front roller support of the present invention is illustrated partially in cross-section as attached through the lower right hand corner of the refrigerator 10. Roller support housing 18 is in the form of a reversed "U"-shaped bracket on which front roller 20 is mounted for rotation about axle 22. The housing 18 is secured as by welding to a vertical threaded rod 24 which is threadedly engaged for movement within threaded sleeve 28 which has threads 27 which are threadedly engaged by internal threads 26 within sleeve 28. Sleeve 28 also contains outer threads 30 on the outer surface and these threads are threadedly engaged with an internally threaded mating member which may optionally be in the form of a nut 32 and related sleeve structure 40 attached by welds 34 to the support housing 36 as shown. The threads 26 of rod 24 are preferably of a right hand direction while the threads 30 of sleeve 28 are of a left hand direction. Further, the lower portion of sleeve 28 is shaped in the form of a nut 38 either formed integrally with the sleeve 28 or attached to the sleeve by welding or other desired attachment.

It can be seen that adjustment of the dimension between the roller and the bottom housing of the refrigerator can be accomplished simply by retaining roller 20 and its housing 18 against rotation while utilizing a suitable wrench (i.e. spanner wrench) and rotating the nut end 38 in the appropriate direction to cause the desired relative movements between the roller and the bottom portion of the refrigerator 10.

In the preferred embodiment, roller 20 and housing 18 are prevented from rotation by the provision of bracket 19 attached by welds 21 to housing 18. This bracket is positioned to enter slot 23 in the housing 36 and the bottom wall of refrigerator 10. The bracket 19 moves upwardly and downwardly as housing 18 moves up and down with respect to the refrigerator 10. This bracket 19 effectively prevents rotation of roller 20 and housing 18 when the adjusting nut 38 is turned. Also, the bracket prevents bending of the roller 20 and the supporting bracketry. Alternatively, the bracket 19 may be eliminated and the roller held manually, but the use of bracket 19 is clearly preferred. The bracket may also be arranged and structured to permit partial rotation of the roller, say plus and minus 20 degrees.

For example, by rotating the nut end 38 in a clockwise direction (as viewed from the top front) the sleeve 28 advances upwardly within its threaded housing 40. This motion in turn causes threaded rod 24 to move in the same withdrawing direction (i.e. upwardly into sleeve 28). Thus, a given amount of rotation of nut end 38 in either the clockwise or counterclockwise direction will clearly result in increasing or decreasing the dimension between the roller housing and the bottom of refrigerator 10 by an amount which is substantially more than if a single threaded rod such as rod 24 were used alone to provide the inward and outward movement. The actual multiple of the movement thus created will in fact depend upon the size and pitch of both the left hand and right hand threads. Therefore, if both the left hand and right hand threads are of equal size and pitch the respective movements will be equal. The effective dimensional advantage produced will be twice the amount of spacing which will be produced between the roller and the refrigerator than that which would be produced with a single rod and fixed sleeve.

Thus, it can be seen that adjustment of the refrigerator height is easily accomplished by merely rotating nut end 38 in the direction which produces the desired movement. It should be noted, however, that although the right and left hand thread arrangement as described is preferred, these threaded arrangements can clearly be reversed while other equivalent structures producing the same result can also be substituted.

Figure 7:
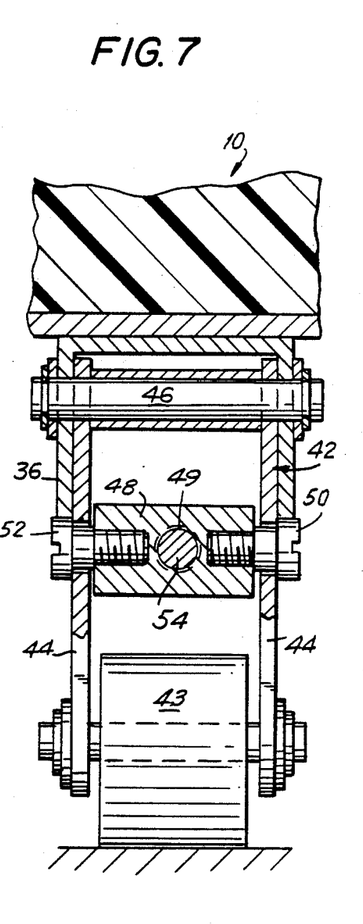
FIG. 7 is a view partially in cross-section taken along lines 7—7 of FIG. 5.

Referring now to FIG. 5, the mechanism of the present system for adjusting the height of the rear portion of the refrigerator of FIGS. 1-3 is also illustrated. Essentially, a housing 42 is illustrated in FIG. 5 which housing is formed primarily of parallel plates 44 which are pivotally connected by shaft 46 extending across the plates as shown in FIG. 7. The plates 44 may be pivotally supported by bushings. Alternatively, they may be supported for rotation by a bearing provided within the apertures of each plate. Plates 44 are provided with a threaded follower nut 48 which extends across the plates and attached by the screws 50 and 52. Follower nut 48 has an internally threaded aperture 49 in which is positioned lead screw 54 extending fore and aft of refrigerator 10 as shown, at a slight incline downwardly and sidewardly from the forward portion. Lead screw 54 is mounted for rotation within bracket support 56 which forms part of housing 36. In the arrangement shown, lead screw 54 is included downwardly and to the right as viewed from the front. Thus, nut follower 55 will contain a threaded aperture which is correspondingly inclined to threadedly receive lead screw 54.

The forward end of lead screw 54 is configured as a nut 58 which can be readily rotated by a socket (or other) wrench, to rotate lead screw 54. Nut 58 may be integrally formed with lead screw 54 or it may be in the form of a nut which is attached by welding or other attachment means to the end portion of lead screw 54. This nut end 58 has a necked down portion 60 which is positioned within a slotted portion 62 of bracket 66 nestled for rotation in a correspondingly configured lower arcuate portion of the slot shown in dotted lines at 64 in FIG. 4. Thus, it can be seen that rotation of nut end 64 produces rotation of the housing 42. Further, rotation of housing 42 to the approximately five o'clock position shown in FIG. 5 illustrates the maximum dimension attainable between the roller 20 and the bottom portion of refrigerator 10. When the housing 42 is rotated to the approximately three o'clock position shown in dotted lines in FIG. 5, the minimum dimension is thus attainable between the roller 43 and the lower portion of the refrigerator 10. Thus, it can be seen that adjustment of the relative dimension between the rear roller 43 and the lower portion of refrigerator 10 is achievable by turning the hexagonal nut end portion 58 of threaded lead screw 54 to produce rotational motion of housing 42 and roller 43 between the maximum height position shown in FIG. 5 and the minimum height position shown in dotted lines in FIG. 5. Correspondingly, rotation of the hexagonal nut end portion of lead screw 54 will cause rotational movement of the housing 42 in a direction opposite the first direction by the fact that lead screw 54 will be threaded within follower nut 55 which actually traverses a portion of the lengthwise dimension of the screw as shown in its two locations corresponding to the maximum and the minimum refrigerator height positions in FIG. 5.

Referring now to FIG. 5 the front roller support and its related hardware is illustrated in the maximum refrigerator height position. In this instance, the maximum refrigerator height dimension has been produced by retaining the roller, 20 and its associated housing 18 fixed against rotation while turning nut end 38 in a counterclockwise direction (as viewed from the top) causing cylindrical double threaded sleeve 28 to withdraw from its housing 40 the maximum amount as shown while simultaneously causing threaded rod 24 to withdraw from the sleeve 28 a similar amount. This is accomplished by bracket 19 which is positioned in channel 23 defined in part by a slot in the housing 36 and a slot in the bottom wall of refrigerator 10. Similarly, rotation of the nut end 38 in the opposite direction will cause twice the amount of movement of both the sleeve 28 and rod 24 in reducing the distance between roller 20 and the bottom of refrigerator 10. Relative movement of sleeve 28 and rod 24 will depend upon the relative sizes of the threads 26 and 30, respectively, i.e. the greater the pitch of the thread, the greater the movement of the component.

It will be readily appreciated that adjustment of the corners of the refrigerator can be readily accomplished with the present system from the front portion of the refrigerator utilizing merely a socket or similar type wrench for the rear and a spanner or similar type wrench for the front. Such adjustment is merely accomplished by rotating the appropriate nut so as to produce the desired height of the refrigerator. It should be noted further that it is now possible to either adjust the level condition of a refrigerator or other suitable cabinet perfectly by monitoring the heights of the forward and rear corners utilizing a leveling tool which may be positioned at the top or other convenient location of the refrigerator. Thereafter, simple rotation of nut ends 38 and 58 (rotation may be simultaneous or not) will cause the appropriate relative changes on one side of the refrigerator thereby making it possible to adjust same from the front portion of the refrigerator. Moreover, such adjustment can be accomplished relatively quickly compared to the prior art adjustments and can also be accomplished without moving the refrigerator.

In the present invention, movement of the refrigerator will normally be relatively simplified since rollers 20 and 43 are present. Furthermore, it should be noted that the refrigerator may be used with the entire support system removed in order to facilitate installation in areas of use in which minimum refrigerator height is required. For example, in the present instance, with the adjustable support apparatus attached as shown in FIG. 5, the movement between the minimum and maximum height can be made to be approximately two inches. Thus, if a refrigerator were structured to have a normal maximum height of say 84 inches, the minimum height of the refrigerator would be 82 inches. Such dimensions are clearly variable depending upon the structure of the particular refrigerator.

With the present invention the entire supporting mechanism can be made to be attached to the bottom surface of the refrigerator by screws or other attachment fasteners while providing reinforcement structures (not shown) within the bottom wall of the refrigerator. Thus, in circumstances where maximum refrigerator capacity is desirable but minimum space is available, it is possible to remove the entire adjustable support system so as to lower the refrigerator to rest on its bottom panel thus eliminating up to two inches or more depending upon the dimensions of the housing members and the respective rollers. For example, in the rear roller arrangement, the housing extends from the bottom of the refrigerator wall to the axis of the roller about one and one-half inches and the roller may be one inch in diameter, leaving one-half inch room between the axis of the roller and the support floor. Thus, eliminating the entire support and levelling system the refrigerator will be lowered about two inches. It is only significant to emphasize the fact that the available dimension between the bottom wall of the refrigerator can be made to be adjusted an infinite number of dimensions without departing from the scope of the invention.

Moreover, by structuring the bottom portion of the refrigerator and the refrigerator door so as to provide minimum interference between the lower portion of the door and its related hinge bracketry and the floor, it will be possible either to retain the entire adjustable support mechanism or to remove the adjustable support mechanism with no consequent interference between the movement of the lower door upon opening and closing. Resting the refrigerator on its lower panel is made possible by the use of the door hinges as disclosed in my copending applications Ser. No. 855,050, filed Apr. 23, 1986 and Ser. No. 45,947, filed May 1, 1987, entitled HINGE ASSEMBLY. The disclosures of these copending patent applications are each expressly incorporated by reference herein. Such arrangement is also made possible by constructing a refrigerator door according to my copending application Ser. No. 45,647, filed Apr. 30, 1987 entitled REFRIGERATOR DOOR AND METHOD OF MANUFACTURING SAME which utilizes door hinges positioned a distance upward of the lower end of the lower door and a distance downward of the upper end of the upper door thus eliminating any interference between the hinge and the floor or base when the door is opened and closed. Further, the height considerations of the refrigerator can also be adjusted by use of a compact efficient refrigerator power module as disclosed in patent application Ser. No. 021,600, filed Mar. 2, 1987. The disclosure of this copending application is expressly incorporated by reference herein and made a part of this application.

It should further be appreciated that the present system has only been described in connection with the forward right hand and rearward right hand corners of the refrigerator 10 shown in FIGS. 1-3. Each system is therefor comprised of a forward roller and support bracketry arrangement and a rearward roller and support bracketry arrangement. Consequently, a standard refrigerator having four corners of which to be supported will contain a similar arrangement on the left hand side as shown in FIGS. 1-3, i.e. forward support roller and related bracket and rearward support roller and related bracket. The entire support system and mechanism can be made as two fore and aft extending channel housings and rollers with the forward rollers independently attached as shown. Alternately, it may be formed as a single base which is attached to the bottom of the refrigerator and which could be constructed to appear a decorative base covering of the rollers on the front side and rearward sides of the refrigerator. Thus, in this last mentioned arrangement, the base would have four sides with associated rollers and bracketry connected thereto and structured and arranged as described above.

What is claimed is:

1. A system for supporting and adjusting a cabinet which includes a base portion for support, which comprises:
   a. support means comprising a male threaded member concentrically threadedly engaged within a first female threaded member, the outer portion of said female threaded member being in turn threadedly engaged in mating engagement within a threaded outer female member, the inner threads of the second mentioned female member being opposite the threads of the male member and the inner portion of the first mentioned female member threadedly engaged therewith, said support means mounted to the base portion of the cabinet at a first located closest to a front accessible portion thereof;
   b. support means mounted to the base portion of the cabinet at a second location remote from said first support means;
   c. means for adjusting the dimension between the base portion of the cabinet and said first support means, said adjusting means being located generally at said first mentioned accessible location closest to the front portion; and
   d. means for adjusting the dimension between the base portion of the cabinet and said second support means and having adjustment control means located in said first mentioned accessible location thereby facilitating respective adjustment of said first and second support means to adjust the respective heights of two portions of the cabinet from a common generally accessible location.

2. The system according to claim 1 wherein said first mentioned adjustable support means is mounted to the base portion of the cabinet at said first location and includes a rotatably mounted roller for supporting the cabinet.

3. The system according the claim 2 wherein said second mentioned adjustable support means is mounted to the base portion of the cabinet at said second location and includes a rotatably mounted roller for providing roller support to said cabinet.

4. The system according to claim 3 wherein said roller support means at said first mentioned location comprises a male threaded member concentrically threadedly engaged with respect to a female threaded member positioned at the base portion of said cabinet.

5. A system for supporting and adjusting a cabinet which includes a base portion for support, which comprises:
   a. supported means mounted to the base portion of the cabinet at a first location closest to a front accessible portion thereof;
   b. support means mounted to the base portion of the cabinet at a second location remote from said first support means;
   c. means for adjusting the dimension between the base portion of the cabinet and said first support means, said adjusting means including a rotatably mounted roller for supporting the cabinet and being mounted to the base portion of the cabinet at said first mentioned accessible location closest to the front portion, wherein said roller support means at said first mentioned location comprises a male threaded member concentrically threadedly engaged with respect to a female threaded member positioned at the base portion of said cabinet, and further wherein said male threaded member is threadedly engaged within a first female threaded member, the outer portion of said female threaded member being in turn threadedly engaged in mating engagement within a threaded outer female member, the inner threads of the second mentioned female member being opposite the threads of the male member and the inner portion of the first mentioned female member threadedly engaged therewith; and
   d. means for adjusting the dimension between the base portion of the cabinet and said second support means and having adjustment control means located in said first mentioned accessible location thereby facilitating respective adjustment of said first and second support means to adjust the respective heights of two portions of the cabinet from a common generally accessible location, said second mentioned adjustable support means including a rotatably mounted roller for providing roller support to said cabinet and being mounted to the base portion of the cabinet at said second location.

6. The system according to claim 5 wherein said first mentioned male member comprises a rod having a right hand thread and said first mentioned female member is threaded on its outer portion with a left hand thread.

7. The system according to claim 6 wherein said threaded rod is connected to an inverted U-shaped roller support having a roller castor rotatably supported thereon by an axle member extending across inverted U-shaped roller support.

8. The system according to claim 7 wherein said first mentioned female member includes an adjustment means attached to said first mentioned female member and capable of being rotatably adjusted to raise or lower said roller with respect to the cabinet, said adjustment means being rotatable in a first direction to cause said first mentioned female member to withdraw from said second mentioned female member and said male threaded rod to withdraw from said first mentioned female member while said inverted U-shaped bracket and said roller means and male threaded rod are held fixed from rotation, and rotation of said adjustment means in the opposite direction while preventing said inverted U-shaped bracket and said male threaded rod from rotating causes said first mentioned female member to threadedly advance further upwardly into said first mentioned female member due to the oppositely configured threads respectively thereon.

9. An adjustable support system for a refrigerator cabinet which comprises:
   a. a base support structure for supporting the cabinet;
   b. roller support means mounted to the base support structure of the cabinet at a first accessible location close to the front of the cabinet;
   c. roller support means mounted to the base support structure of the cabinet at a second location remote from said first location;

d. means for adjusting the dimension between the base support structure of the cabinet and said first roller support means, said adjusting means including:
  i. a first cylindrical member threadedly engaged for upward and downward movement within a second internally threaded cylindrical member fixed to the base structure;
  ii. an elongated rod member threadedly engaged for up and down movement within said first mentioned cylindrical member, the threads on said elongated rod member being opposite in direction to the threads on said first mentioned cylindrical member, said threaded rod member being connected to a roller housing in which a support roller is rotatably mounted, whereby rotating said first mentioned cylindrical member in a first direction while retaining said roller housing in fixed position against rotation causes said first mentioned cylindrical member and said rod member to advance in a first direction, and rotation of said first mentioned cylindrical member in a second direction while retaining said roller housing in fixed position against rotation causes said first mentioned cylindrical member and said rod member to advance in the opposite direction to adjust the dimension between said base support structure and said roller support to adjust the height of the corresponding portion of the cabinet;
e. housing connected to said base structure and extending from said first mentioned accessible location to a location remote from said first mentioned location;
f. roller support means rotatably mounted to said housing at said remote location said roller support means being rotatably supported within a roller housing pivotally mounted to said mentioned housing to vary the vertical dimension between the base support structure and the bottom of said roller support means to facilitate adjustment of the vertical height of the corresponding portion of the cabinet; and
g. an elongated threaded adjustment rod extending from said first accessible location to said remotely positioned roller support means and fixedly supported for threaded rotation from said accessible location, said threaded rod being threadedly engaged within a female threaded follower member attached to said remotely positioned roller housing such that rotation of said threaded rod in a first direction causes said roller housing to pivotally rotate in a first direction to increase the dimension between said roller means and said base structure, and rotation of said threaded rod in the opposite direction causes pivotal rotation of said remotely positioned roller housing in the opposite direction to decrease the dimension between said base structure and said roller means thereby facilitating adjustment of the height of the corresponding portion of the cabinet from said first accessible location.

10. The adjustable support system according to claim 9 wherein means is positioned at said first mentioned accessible location to rotate said threaded adjustment rod to thereby adjust the height of the cabinet at said remote location from said accessible location.

11. A system for supporting and adjusting a refrigerator cabinet having a base portion which comprises:

a. roller support means mounted to the base portion of the cabinet at a first location close to a front accessible portion thereof said roller support means including adjusting means for adjusting said height of the portion of the cabinet to which it is attached, said adjusting means including:
  i. a first cylindrical member threadedly engaged for upward and downward movement within a second internally threaded cylindrical member fixed to the base structure;
  ii. an elongated rod member threadedly engaged for up and down movement within said first mentioned cylindrical member, the threads on said elongated rod member being opposite in direction to the threads on said first mentioned cylindrical member, said threaded rod member being connected to a roller housing n which a support roller is rotatably mounted, whereby rotating said first mentioned cylindrical member in a first direction while retaining said roller housing in fixed position against rotation causes said first mentioned cylindrical member and said rod member to advance in a first direction, and rotation of said first mentioned cylindrical member in a second direction while retaining said roller housing in fixed position against rotation causes said first mentioned cylindrical member and said rod member to advance in the opposite direction to adjust the dimension between said base support structure and said roller support to adjust the height of the corresponding portion of the cabinet;
b. housing connected to said base structure and extending from said first mentioned accessible location to a location remote from said first mentioned location;
c. roller support means rotatably mounted to said housing at said remote location said roller support means being rotatably supported within a roller housing pivotally mounted to said mentioned housing to vary the vertical dimension between the base support structure and the bottom of said roller support means to facilitate adjustment of the vertical height of the corresponding portion of the cabinet; and
d. an elongated threaded adjustment rod extending from said first accessible location to said remotely positioned roller support means and fixedly supported for threaded rotation from said accessible location, said threaded rod being threadedly engaged within a female threaded follower member attached to said remotely positioned roller housing such that rotation of said threaded rod in a first direction causes said roller housing to pivotally rotate in a first direction to increase the dimension between said roller means and said base structure, and rotation of said threaded rod in the opposite direction causes pivotal rotation of said remotely positioned roller housing in the opposite direction to decrease the dimension between said base structure and said roller means thereby facilitating adjustment of the height of the corresponding portion of the cabinet from said first accessible location.

12. The system according to claim 11 wherein means is provided for retaining said roller support means in said accessible location against rotation.

13. The system according to claim 12 wherein said means for retaining said roller support means against rotation is a bracket member attached to the roller housing and slidably extending into a slot defined by said last mentioned housing and the base wall of said cabinet.

14. A system for supporting and adjusting a cabinet which includes a base portion for supporting the cabinet, which comprises:

a. roller support means comprising a male threaded member concentrically threadedly engaged within a first female threaded member, the outer portion of said female threaded member being in turn threadedly engaged in mating engagement within a threaded outer female member, the inner threads of the second mentioned female member being opposite the threads of the male member and the inner portion of the first mentioned female member threadedly engaged therewith, said support means mounted to the base portion of the cabinet at a first location closest to a front accessible portion thereof;

b. roller support means mounted to the base portion of the cabinet at a second location remote from said first support means;

c. roller means for adjusting the dimension between the base portion of the cabinet and said first roller support means, said adjusting means being located generally at said first mentioned accessible location closest to the front portion; and d. means for adjusting the dimension between the base portion of the cabinet and said second support means and having adjustment control means located in aid first mentioned accessible location thereby facilitating respective adjustment of said first and second roller support means to adjust the respective height of two portions of the cabinet from a common generally accessible location while permitting rolling support and movement of said cabinet on said roller support means.

* * * * *